United States Patent [19]

Grebe et al.

[11] 4,213,777

[45] Jul. 22, 1980

[54] MAKING IRON POWDER HAVING FIBER-LIKE PARTICLES

[75] Inventors: Klaus Grebe, Kettwig; Hans De Haas, Meerbusch, both of Fed. Rep. of Germany

[73] Assignee: Mannesmann Aktiengesellschaft, Düsseldorf, Fed. Rep. of Germany

[21] Appl. No.: 931,886

[22] Filed: Aug. 8, 1978

Related U.S. Application Data

[63] Continuation of Ser. No. 783,004, Mar. 30, 1977, abandoned.

[30] Foreign Application Priority Data

Mar. 31, 1976 [DE] Fed. Rep. of Germany ....... 2614342

[51] Int. Cl.$^2$ .......................... B22F 1/04; C21B 13/00
[52] U.S. Cl. ..................................... 75/0.5 BA; 75/34
[58] Field of Search ............ 75/0.5 R, 0.5 B, 0.5 BA, 75/0.5 BB, 0.5 BC, 0.5 AA, 34, 35; 423/416, 418, 563

[56] References Cited

U.S. PATENT DOCUMENTS

| | | | |
|---|---|---|---|
| Re. 14,277 | 3/1917 | Garner et al. ........................ | 423/563 |
| 2,809,097 | 10/1957 | Adcock et al. ...................... | 423/418 |
| 3,377,156 | 4/1968 | Kalima et al. ........................ | 75/26 |
| 3,583,864 | 6/1971 | Adler .................................. | 75/0.5 BA |
| 3,902,865 | 9/1975 | Leavenworth, Jr. ............ | 75/0.5 BA |
| 3,975,186 | 8/1976 | Grebe et al. ..................... | 75/0.5 AA |
| 4,054,443 | 10/1977 | Jaco, Jr. ............................. | 75/0.5 BA |

OTHER PUBLICATIONS

Wagner, F. H.; *Coal and Coke* 1st ed; McGraw Hill, New York, N.Y., p. 73, (1916).

*Primary Examiner*—L. Dewayne Rutledge
*Assistant Examiner*—Michael L. Lewis
*Attorney, Agent, or Firm*—Smyth, Pavitt, Siegemund, Jones & Martella

[57] ABSTRACT

Iron oxide powder, e.g., ore, is reduced in a $CO/N_2$ atmosphere at a temperature between 750° to 1200° C., whereby prior to the onset of precipitation of metallic iron the content of $H_2$ is limited to 15% (vol) of the CO content, and $SO_2$, $H_2S$, COS or another suitable gaseous sulphur compound is developed or maintained in the reducing atmosphere at a range from 0.0005 to 0.1% (vol), preferably 0.001 to 0.01% (vol) in relation to the CO content.

12 Claims, No Drawings

MAKING IRON POWDER HAVING FIBER-LIKE PARTICLES

This is a continuation of application Ser. No. 783,004, filed Mar. 30, 1977 now abandoned.

BACKGROUND OF THE INVENTION

The present application relates to a method of making iron powder by reducing iron oxides to produce powder particles having fiber-like configuration and texture.

U.S. Pat. No. 3,975,186 discloses a method of making fibrous iron powder particles by spray calcination of a pickling solution that was used for pickling iron and steel. The resulting iron oxide particles were reduced in a CO atmosphere at a temperature between 800° and 1000° C. This patent discloses also that an $SO_2$ content in excess of 1% of the CO content in the reducing atmosphere positively interfers with the fiber formation; so does an excessive amount of $H_2$.

This method is quite practical but depends on spray calcination to obtain iron oxide as intermediate raw material. Other iron oxides, e.g. ore, cannot be used or only with inadequate yield for making fibrous iron powder through the reducing process as outlined in that patent. However, it is apparent that iron oxides generally, and particularly ores, are readily available raw materials. Therefore, it is quite desirable to use them in some fashion for making iron powder.

DESCRIPTION OF THE INVENTION

It is an object of the present invention to provide a new and improved method of making iron powder having fibrous or fiber-like particles, but using any kind of iron oxide as raw material.

It is a specific object of the present invention to process iron oxides of any kind, not just those made by spray calcination, but preferably iron ore to obtain fibrous iron powder particles.

In accordance with the preferred embodiment of the present invention, it is suggested to reduce iron oxide (e.g. ore) at a temperature between 750° and 1200° C. in a $CO/N_2$ atmosphere, whereby from the onset of the precipitation of the first traces of metallic iron, or earlier, and up to termination of the reducing, the $H_2$ content in the said atmosphere is limited to 15% (vol) of the CO content; the CO to $N_2$ ratio is to be about 100:0 to 30:70% volume. In addition, gaseous sulphur compounds are maintained in and as part of the reducing gas and at a concentration of at least 0.0005% but not more than 0.1% (vol) of the CO content. A range of 0.001 to 0.01% was found to be preferred. The reduction product is cooled to room temperature, either in an or in the reducing atmosphere or in an inert atmosphere, e.g. $N_2$. Finally, the resulting cake is ground to powder.

The presence of one or more sulphur compounds was found to be critical for the formation of fibers; however, too much sulphure is as detrimental as complete absence. The invention, therefore, is to be seen in the discovery that formation of iron fibers depend on the presence of a small amount of sulphur compound or compounds. This discovery is surprising indeed, because most large scale reduction processes are accompanied by the release of sulphure compounds, but fiber particles are not (or only to a very insignificant extent) produced during these processes. Moreover, it was believed (correctly) that sulphure compounds do indeed interfer with the formation of fibers; it is, therefor, quite surprising that the presence of a very small amount of sulphure does not just merely fail to interfer in the formation of fibers, but is an indispensible prerequisite. However, excessive amounts of sulphur compounds (more than about 0.1% is deemed excessive) still do inhibit the formation of fibers. This alone, however, is not sufficient. Rather, the use of sulphur compounds as a fiber forming agent is based additionally on the companion discovery that the hydrogen content must be strictly limited during the iron precipitation phase. These aspects taken together obscured in the past the possible effect of a low content in sulphure additives under specified conditions as to hydrogen. Generally speaking, the timing and quantitative relation between sulphur release and iron precipitation as per the invention is deemed critical and is not present in prior art methods.

The inventive method does permit use of any kind of iron oxides as raw materials, but preferably ores are used. Oxides made by spray calcination of pickling solution can also be used, but the inventive method is by no means limited to iron oxides made by the calcination method.

In furtherance of the invention, it is suggested to feed the desired sulphur compound as a gas into the reduction chamber while the feeding is accurately metered so that the resulting concentration remains within the stated limit. One will use preferably $SO_2$; $H_2S$; COS; or the like. Alternatively, one can mix the iron oxide to be reduced with solid sulphur compounds which will form gaseous sulphur compounds, e.g. from roasting of pyrites at least within the prescribed period and in the required amount. However, it is also conceivable that the particular ore used contains already sulphur compounds, and it may merely be necessary to pretreat that raw material so that the quantity released during reducing is not below or in excess of the stated limits.

The CO content of the reducing atmoshpere may also be produced by mixing the iron oxide with a carbon carrier such as charcoal, and the CO will then be formed in the needed amount during the hot reducing process.

It can thus be seen that the formation of CO and of the gaseous sulphur compound can be combined by mixing the iron oxide with a particular variety of coal that contains sulphur compounds. Of course, the amount of sulphur compound here must be very accurately predetermined so that the required quantities of each of these gaseous additives is formed and released in the reduction chamber.

In furtherance of the invention, the following details should preferably be observed. The iron oxide used should be a powder with particle sizes predominantly between 0.005 mm to 0.5 mm. If the predominant portion of the powder has a smaller than 0.005 mm particle size, the formation of fibers is preferably additionally enhanced by tempering the raw material in a neutral or oxidizing atmosphere for about one quarter hour to one hour at a temperature between about 1000° and 1200° C.

The formation of fiber-like particles is further enhenced if one adds to the iron oxide, prior to the reduction, alkali or earth alkaline compounds, preferably CaO at an amount from 0.2 to 2% by weight.

The powder made in accordance with the invention has particles having well developed fiber-like configuration and, therefore, is excellently suited for friction lining of brakes, clutches, couplings or the like, particularly for motor vehicles.

The invention is not limited to the embodiments described above but all changes and modifications thereof not constituting departures from the spirit and scope of the invention are intended to be included.

We claim:

1. Method of making iron powder, in which the particles have fiber-like configuration, comprising the steps of using regular iron oxide as raw material which has not been produced by a spray calcination,
   reducing said iron oxide in an atmosphere of carbon oxide and nitrogen at a temperature within the range of 750° to 1200° C.;
   limiting a hydrogen content in the reducing atmosphere during the last phase of reducing, but beginning not later than the commencing of precipitation of metallic iron, to not more than 15% by volume of the CO content in the atmosphere;
   providing the reducing atmosphere with at least one gaseous sulphur compound of at least 0.0005%, but not more than 0.1% by volume in relation to the CO content;
   causing the reduction product to cool in a reducing or inert atmosphere; and
   grinding the cooled product to powder.

2. In a method of making iron powder, the method including reducing iron oxide in an atmosphere of carbon oxide and nitrogen at a temperature within the range of 750° to 1200° C. while limiting the hydrogen content, and subsequently cooling the reduction product in a reducing or inert atmosphere, the improvement of making fiber-like particles, comprising in combination:
   using iron oxide as raw material which has not been produced by spray calcination;
   said limiting step being effective not later than upon commencing of precipitation of metallic iron and for the remainder of the reduction, the limiting step being further effective to limit the hydrogen content to not more than 15% by volume of the CO content of the atmosphere; and
   providing the reducing atmosphere with at least one gaseous sulphur compound of at least 0.0005%, but not more than 0.1% sulphur by volume in relation to the CO content of the reducing atmosphere.

3. Method as in claim 1, wherein the sulphur-providing step limits the sulphur compound content to a range from 0.001% to 0.01% (vol) in relation to the CO content.

4. Method as in claim 1 or 2, said sulphur-compound-providing step including feeding $SO_2$, $H_2S$, or COS into said atmosphere.

5. Method as in claim 1 or 2, wherein the sulphur-compound-providing step includes mixing the iron oxide with at least one solid sulphur compound, producing the gaseous sulphur compound during the reducing step.

6. Method as in claim 1, including the step of mixing the iron oxide with a carbon carrier, so that CO is produced during the reducing step.

7. Method as in claim 1 or 2, and including the step of mixing the iron oxide with coal that contains at least one sulphur compound, so that the carbon oxide and the gaseous sulphur compound forms during the reducing step.

8. Method as in claim 1, wherein the iron oxide used for reducing contains already at least one sulphur compound forms the gaseous compound during the reducing step.

9. Method as in claim 1, wherein the iron oxide used is a powder most of whose particles have grain sizes within a range from 0.005 to 0.5 mm.

10. Method as in claim 1, wherein the iron oxide used is a powder, most particles having a size below 0.005 mm, the reducing step being preceded by tempering the iron oxide from ¼ to 1 hour at a temperature between 1000° C. and 1200° C. in a neutral or oxidizing atmosphere.

11. Method as in claim 1, and including the step of mixing the iron oxide with an alkali or earth alkaline compound at a proportion from 0.2 to 2% (weight).

12. Method as in claim 11, said compound for the mixing step being CaO.

* * * * *